United States Patent
Yan et al.

(10) Patent No.: US 9,258,077 B2
(45) Date of Patent: Feb. 9, 2016

(54) BUTTERFLY FILTER COEFFICIENT SETTING METHOD AND DEVICE, RECEIVER AND RECEIVING METHOD

(71) Applicant: Fujitsu Limited, Kanagawa (JP)

(72) Inventors: Meng Yan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 208 days.

(21) Appl. No.: 14/041,640

(22) Filed: Sep. 30, 2013

(65) Prior Publication Data
US 2014/0037291 A1    Feb. 6, 2014

Related U.S. Application Data

(63) Continuation of application No. PCT/CN2011/072340, filed on Mar. 31, 2011.

(51) Int. Cl.
*H04B 10/61*    (2013.01)
*H04J 14/06*    (2006.01)
(Continued)

(52) U.S. Cl.
CPC .............. *H04J 14/06* (2013.01); *H04B 10/614* (2013.01); *H04B 10/616* (2013.01); *H04B 10/6163* (2013.01); *H04L 5/04* (2013.01); *H04L 27/265* (2013.01); *H04L 27/2642* (2013.01); *H04L 5/0008* (2013.01); *H04L 27/2607* (2013.01); *H04L 27/2655* (2013.01)

(58) Field of Classification Search
CPC .......................... H04B 10/6163; H04B 10/614
See application file for complete search history.

(56) References Cited

U.S. PATENT DOCUMENTS

2004/0081131 A1* 4/2004 Walton et al. ................. 370/344
2010/0189445 A1* 7/2010 Nakashima et al. .......... 398/152
(Continued)

FOREIGN PATENT DOCUMENTS

| CN | 101621338 | 1/2010 |
|---|---|---|
| CN | 101895499 | 11/2010 |

(Continued)

OTHER PUBLICATIONS

International Search Report mailed Jan. 5, 2012 in corresponding International Application No. PCT/CN2011/072340.
(Continued)

*Primary Examiner* — Nathan Curs
(74) *Attorney, Agent, or Firm* — Staas & Halsey LLP

(57) ABSTRACT

The present invention relates to a butterfly filter coefficient setting method and device, a receiver, and a receiving method. The receiver is a DP-CO-OFDM receiver, comprising: a phase recovery device configured to perform a phase recovery of a received signal one OFDM symbol by one OFDM symbol, so as to obtain a phase-recovered first polarization signal and a phase-recovered second polarization signal; a butterfly filter configured to perform butterfly filtration of the phase-recovered first polarization signal and the phase-recovered second polarization signal one OFDM symbol by one OFDM symbol, so as to obtain a butterfly-filtered first polarization signal and a butterfly-filtered second polarization signal; a coefficient setting unit configured to set a filter coefficient used by the butterfly filter for the current OFDM symbol; and a data recovery device configured to recover data from the butterfly-filtered first polarization signal and the butterfly-filtered second polarization signal.

14 Claims, 6 Drawing Sheets

(51) Int. Cl.
*H04L 5/04* (2006.01)
*H04L 5/00* (2006.01)
*H04L 27/26* (2006.01)

(56) References Cited

U.S. PATENT DOCUMENTS

2012/0020405 A1    1/2012    Chen et al.
2012/0121274 A1*   5/2012    Fludger .................. 398/208
2012/0308234 A1*  12/2012    Bianciotto et al. .......... 398/65

FOREIGN PATENT DOCUMENTS

| EP | 2 290 837 | 3/2011 |
|---|---|---|
| JP | 2010-268404 | 11/2010 |
| JP | 2012-522439 | 9/2012 |
| WO | 2010/111897 A1 | 10/2010 |

OTHER PUBLICATIONS

Japanese Office Action dated Jan. 20, 2015 in corresponding Japanese Patent Application No. 2014-501394.
Karlsson et al., "Effects of Nonlinearities on PMD-Induced System Impairments", Journal of Lightwave Technology, vol. 24, No. 11, Nov. 2006, pp. 4127-4137.
Li et al., "Nonlinear Polarization Crosstalk Canceller for Dual-Polarization Digital Coherent Receivers", Optical Society of America, 2010, 3 pp.
Chinese Office Action issued Apr. 14, 2015 in corresponding Chinese Patent Application No. 201180063143.1.
English Abstract of Chinese Reference No. 101895499.

* cited by examiner

BUTTERFLY FILTER COEFFICIENT SETTING METHOD AND DEVICE, RECEIVER AND RECEIVING METHOD

CROSS REFERENCE TO RELATED APPLICATIONS

This application is a continuation of and claims the benefit of International Application No. PCT/, filed, and claims the benefit of Korean Application No., filed, and Korean Application No., filed, the disclosures of all of which are incorporated herein by reference.

TECHNICAL FIELD

The present invention relates to optical communications and, more particularly, to a digital coherent optical receiver.

BACKGROUND

The Orthogonal Frequency Division Multiplexing (OFDM) technology is a multi-carrier communication technology, which distributes data to be transmitted to a plurality of sub-carriers to be transmitted in parallel. The intervals between the sub-carriers are equal to a baud rate and the sub-carriers are orthogonal to one another in the frequency domain. The transform from a frequency domain to a time domain and the transform from a time domain to a frequency domain are completed at the transmitting side and the receiving side, respectively, by using Inverse Fast Fourier Transform (IFFT) and Fast Fourier Transform (FFT). In order to eliminate Inter-Symbol Interference (ISI), a Cyclic Prefix (CP) is introduced in an OFDM system, and there is no interference between OFDM symbols when the length of the CP is larger than the maximum extension delay of a channel. The CP reserves the cycle characteristics of IFFT/FFT, and it is equivalent that each sub-carrier experiences a flat fading channel. Thus a frequency domain equalization can be realized by using an equalizer with a single tap, which is simpler than a multi-tap time domain equalization in a single-carrier system. As compared with a single-carrier signal, an OFDM signal has a spectrum more approximate to a rectangle, and its spectrum efficiency is higher since less bandwidth is occupied. The OFDM signal has another advantage that it can flexibly perform power distribution and format modulation for each sub-carrier, so that the OFDM signal is more suitable for a channel having complex frequency domain fading characteristics, thereby maximizing the capacity.

In the field of optical communications, the coherent optical communication can achieve better performance and higher spectrum efficiency than the traditional intensity modulation-direct detection optical communication system, and it is deemed as the main technology for realizing the next generation high-speed and large-capacity optical communication system. The OFDM technology widely used in the field of wireless communications can also be applied to the coherent optical communication, i.e., the Coherent Optical OFDM (CO-OFDM). In order to further improve the system capacity, two orthogonal polarization states of light may be used to transmit information in the CO-OFDM system, which is referred to as Dual Polarization (DP) CO-OFDM.

FIG. 1 schematically illustrates a functional block diagram of a conventional DP-CO-OFDM receiver. As illustrated in FIG. 1, in the conventional DP-CO-OFDM receiver, a received signal with two polarization states $r_h(t)$ and $r_v(t)$ is firstly transformed into a signal in a frequency domain, after undergoing a symbol synchronization process by a symbol synchronization unit 101, a carrier synchronization process by a carrier synchronization unit 102 and an FFT by an FFT unit 103. The obtained signal in the frequency domain goes through a channel estimation and equalization by a channel estimation and equalization unit 104 and, then, experiences a phase recovery in a phase recovery unit 105 and a data recovery in a data recovery unit 106, thereby completing the reception of the signal transmitted by a transmitter.

During the study of the present invention, the inventor of the present invention studies the receivers of the relevant art, and finds that a nonlinear effect of an optical fiber is a main limiting factor for the coherent optical OFDM system in the relevant art, and the detailed analysis is given as follows.

A traditional channel estimation and equalization method is based on training data. The conventional channel estimation and equalization unit 104 estimates one 2×2 channel inverse matrix for each sub-carrier, and multiplies it with a received signal to compensate for channel damage.

This method assumes that the channel is not changed in an OFDM symbol period, so damage caused by a channel change in the symbol period cannot be compensated.

When the DP-CO-OFDM channel and other channels are transmitted together in form of Wavelength Division Multiplexing (WDM), due to the nonlinear effect of an optical fiber, the other channels will exert a cross phase modulation (XPM) and a cross polarization modulation (XPoIM) on the DP-CO-OFDM signal. The XPM produces an additional phase modulation on the DP-CO-OFDM signal of the channel, and the XPoIM causes crosstalk between two orthogonal polarization states. The two nonlinear effects are both time variant, and can be deemed as a multiplicative damage and described as follows:

$$r_h(t)=w_{hh}(t)s_h(t)+w_{vh}(t)s_v(t)$$
$$r_v(t)=w_{hv}(t)s_h(t)+w_{vv}(t)s_v(t) \quad (1)$$

where, $s_h(t)$ and $s_v(t)$ are the complex amplitudes of the signal transmitted in two orthogonal polarization states, $r_h(t)$ and $r_v(t)$ are the complex amplitudes of the received signal, $w_{hh}(t)$, $w_{vh}(t)$, $w_{hv}(t)$ and $w_{vv}(t)$ are four time variant complex functions, which describe the XPM and XPoIM effects. The time constants of the two nonlinear effects are related to a bandwidth of the signal of an adjacent channel and a chromatic dispersion of an optical fiber link. When the signal of the adjacent channel is also a high-speed optical signal, the XPM and XPoIM effects are both fast time variant, and the time constants probably may be less than the OFDM symbol period. When the time constants are less than the OFDM symbol period, $w_{hh}(t)$, $w_{vh}(t)$, $w_{hv}(t)$ and $w_{vv}(t)$ cannot be regarded as constants in one symbol period, which is equivalent to a multiplicative damage of the fast time-variant channel. The traditional DP-CO-OFDM is helpless to the damage.

To be noted, the above descriptions of the conventional technology shall not be construed as well known to those skilled in the art just because they are given herein.

REFERENCES

1. M. Karlsson et al, Effects of nonlinearities on PMD-induced system impairments, Journal of Lightwave Technology, Vol. 24, No. 11, 2006.
2. Lei Li et al, Nonlinear polarization crosstalk canceller for dual polarization digital coherent receivers, OWE3, Conference on Optical Fiber Communication, 2010.

SUMMARY

The present invention is proposed with respect to the current situation of the relevant art, so as to overcome or relieve one or more shortages caused by the limitations of the relevant art, and provide at least one beneficial selection.

In order to achieve the above objective, according an aspect of the present invention, a DP-CO-OFDM receiver is proposed, which is compensative for the above damage.

According an aspect of the present invention, a DP-CO-OFDM receiver is provided, comprising: a phase recovery device configured to perform a phase recovery of a received signal one OFDM symbol by one OFDM symbol, so as to obtain a phase-recovered first polarization signal and a phase-recovered second polarization signal; a butterfly filter configured to perform butterfly filtration of the phase-recovered first polarization signal and the phase-recovered second polarization signal one OFDM symbol by one OFDM symbol, so as to obtain a butterfly-filtered first polarization signal and a butterfly-filtered second polarization signal; a coefficient setting unit configured to set a filter coefficient used by the butterfly filter for the current OFDM symbol; and a data recovery device configured to recover data from the butterfly-filtered first polarization signal and the butterfly-filtered second polarization signal.

According to another aspect of the present invention, a receiving method used in a DP-CO-OFDM receiver is provided, comprising: performing a phase recovery of a received signal one OFDM symbol by one OFDM symbol, so as to obtain a phase-recovered first polarization signal and a phase-recovered second polarization signal; setting a filter coefficient used by a butterfly filter for the current OFDM symbol; performing, by the butterfly filter by using the filter coefficient, butterfly filtration of the phase-recovered first polarization signal and the phase-recovered second polarization signal one OFDM symbol by one OFDM symbol, so as to obtain a butterfly-filtered first polarization signal and a butterfly-filtered second polarization signal; and recovering data from the butterfly-filtered first polarization signal and the butterfly-filtered second polarization signal.

According to still another aspect of the present invention, a butterfly filter coefficient setting device capable of being used as a coefficient setting unit in the aforementioned receiver is provided, wherein the butterfly filter coefficient setting device comprises: a receiving end data matrix construction unit configured to construct a receiving end data matrix having the number of columns twice of the number of taps of the butterfly filter, based on data in first and second polarization directions carried on a plurality of sub-carriers of respective symbols of the receiving end after the phase recovery; a training data vector acquisition unit configured to determine the data in the first and second polarization directions transmitted by a transmitting end on sub-carriers corresponding to respective rows of the receiving end data matrix, and construct training data vectors in the first and second polarization directions corresponding to the receiving end data matrix by using the determined data in the first and second polarization directions; and a coefficient calculation unit configured to determine a filter coefficient according to the receiving end data matrix and the training data vectors.

According to yet another aspect of the present invention, a butterfly filter coefficient setting method capable of being used in the aforementioned butterfly filter coefficient setting device is provided, comprising: constructing a receiving end data matrix having the number of columns twice of the number of taps of the butterfly filter, based on data in first and second polarization directions carried on a plurality of sub-carriers of respective OFDM symbols after the phase recovery; determining corresponding data in the first and second polarization directions transmitted by a transmitting end on the plurality of sub-carriers, and constructing training data vectors in the first and second polarization directions corresponding to the receiving end data matrix; and determining a filter coefficient according to the receiving end data matrix and the training data vectors.

To be noted, the term "comprise/include" herein specifies the presence of feature, element, step or component, not excluding the presence or addition of one or more other features, elements, steps or components.

The above generic descriptions and the following detailed descriptions made with reference to the drawings are all schematic, rather than limitations to the protection scope of the present invention.

BRIEF DESCRIPTION OF THE DRAWINGS

According to the following detailed descriptions of the present invention made with reference to the drawings, the above and other objectives, features and advantages of the present invention will be understood more clearly.

DESCRIPTION OF THE EMBODIMENTS

The specific embodiments of the present invention will be described as follows with reference to the drawings. Those descriptions are exemplary to help the understanding of the present invention by a person skilled in the art, rather than limitations to the protection scope of the present invention.

Figure 2:
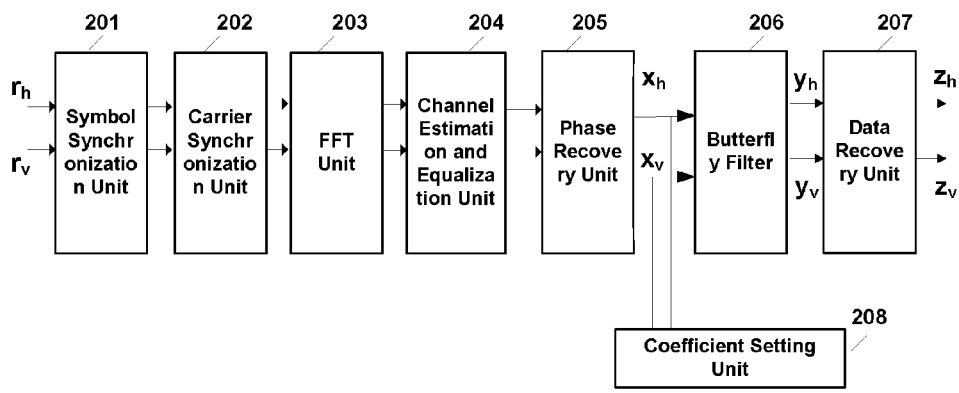
FIG. 2 illustrates a functional block diagram of a DP-CO-OFDM receiver according to an embodiment of the present invention.

FIG. 2 illustrates a functional block diagram of a DP-CO-OFDM receiver according to an embodiment of the present invention.

A symbol synchronization unit 201 illustrated in FIG. 2 performs symbol synchronization of a received signal in two polarization states, a carrier synchronization unit 202 performs carrier synchronization, an FFT unit 203 performs a fast Fourier transform to transform a received time-domain signal into a frequency-domain signal. The acquired frequency-domain signal subsequently undergoes a channel estimation and equalization by a channel estimation and equalization unit 204, and a phase recovery by a phase recovery unit 205. The processing by those modules may be performed in any method known to a person skilled in the art at present or in future, and herein is omitted.

Figure 1:
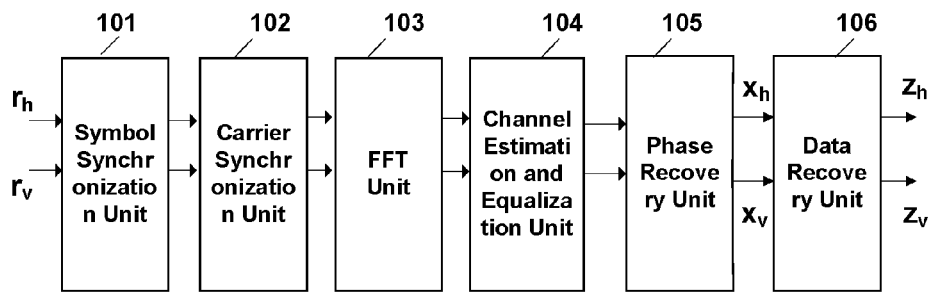
FIG. 1 schematically illustrates a functional block diagram of a conventional DP-CO-OFDM receiver.

In the receiver according to the embodiment of the present invention, which is different from the conventional receiver as illustrated in FIG. 1, the phase-recovered symbol firstly enters a butterfly filter 206 for filtration, rather than directly entering a data recovery unit for a data recovery, and then it is input to the data recovery unit 207 for a data recovery.

Figure 3:
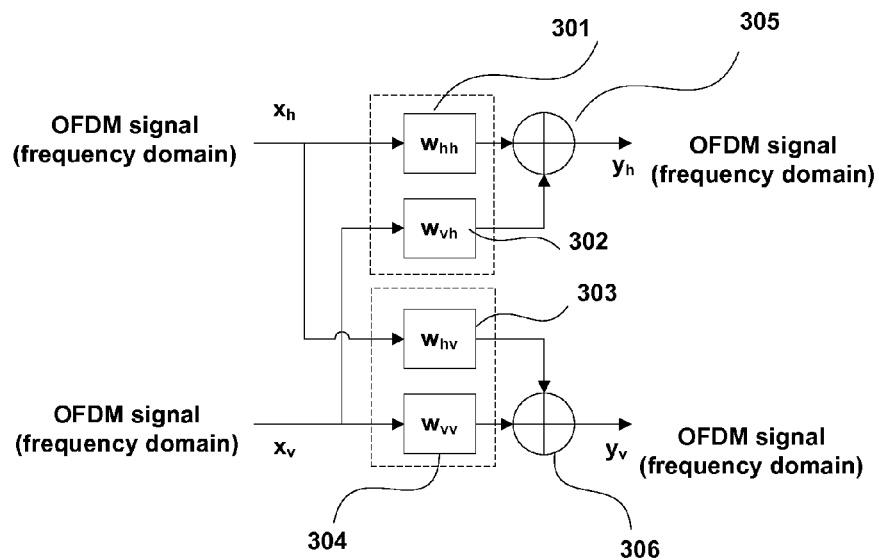
FIG. 3 illustrates a schematic structure diagram of a butterfly filter according to an embodiment of the present invention.

FIG. 3 illustrates a schematic structure diagram of a butterfly filter according to an embodiment of the present invention.

As illustrated in FIG. 3, the butterfly filter according to an embodiment of the present invention comprises a first filter 301, a second filter 302, a third filter 303, a fourth filter 304, a first adder 305 and a second adder 306. In one embodiment, each of the filters is a finite impulse response (FIR) filter.

The phase-recovered H-polarized signal $x_h$ output from the phase recovery unit 205 is input to the first filter 301 and the third filter 303. The phase-recovered V-polarized signal $x_v$ output from the phase recovery unit 205 is input to the second filter 302 and the fourth filter 304. The outputs of the first filter 301 and the second filter 302 are input to the first adder 305, and the outputs of the third filter 303 and the fourth filter 304 are input to the second adder 306. The outputs of the first adder and the second adder are input to the data recovery unit 207 for a data recovery.

$W_{hh}$, $W_{vh}$, $W_{hv}$ and $W_{vv}$ in FIG. 3 represent the coefficients of the first to fourth filters, respectively.

Viewed from the frequency domain, the time-variant multiplicative damage will cause inter-carrier interference (ICI). Equation (2) is obtained by transforming Equation (1) into the frequency domain:

$$r_h(f) = w_{hh}(f) \otimes s_h(f) + w_{vh}(f) \otimes s_v(f)$$

$$r_v(f) = w_{hv}(f) \otimes s_h(f) + w_{vv}(f) \otimes s_v(f) \quad (2)$$

where $\otimes$ indicates a convolution. Viewed from the frequency domain, the received signal is a convolution of several sub-carriers in two polarization directions, which is just a presentation of ICI. In order to eliminate the ICI, a deconvolution may be performed using the butterfly FIR filter.

Since each OFDM symbol period has different multiplicative damage, it is necessary to perform an individual compensation on each OFDM symbol. That is, the four filter coefficients in the butterfly FIR shall be determined for each OFDM symbol, so that the equalized signal is approximate to the transmitted signal. This process may be represented as follows:

$$y_h(f) = w_{hh}(f) \otimes x_h(f) + w_{vh}(f) \otimes x_v(f)$$

$$y_v(f) = w_{hv}(f) \otimes x_h(f) + w_{vv}(f) \otimes x_v(f) \quad (3)$$

In which, $x_h(f)$ and $x_v(f)$ are frequency domain signals obtained after a phase recovery of the current OFDM symbol; $y_h(f)$ and $y_v(f)$ are outputs of the butterfly filter in the frequency domain. To be noted, the butterfly filter illustrated in FIG. 3 is exemplarily rather than a limitation to the scope of the present invention. The butterfly filter in the embodiment of the present invention shall be understood broadly, and any filter or filter combination capable of realizing the deconvolution function of Equation (3) may be referred to as a butterfly filter.

As can be seen from the above analysis, when the coefficients of the butterfly filter are updated one symbol by one symbol, the ICI can be eliminated according to the embodiment of the present invention, thereby improving the performance of the receiver.

Next, a coefficient setting unit according to the present invention will be introduced. As mentioned before, since each OFDM symbol period has different multiplicative damage, it is necessary to perform an individual compensation on each OFDM symbol. A coefficient setting unit 208 according to the embodiment of the present invention is configured to set a filter coefficient of the butterfly filter one OFDM symbol by one OFDM symbol.

Figure 4:
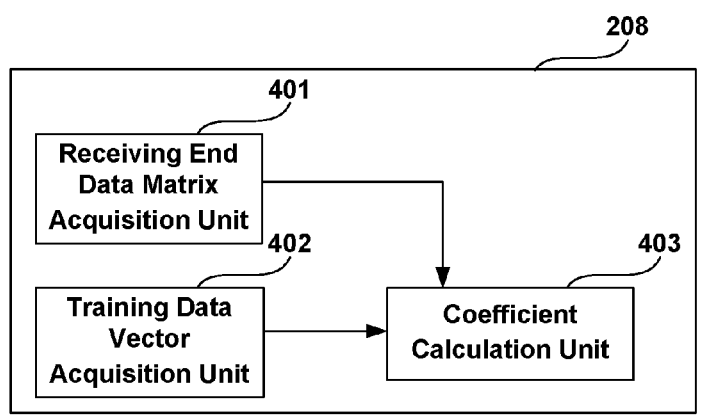
FIG. 4 schematically illustrates a functional block diagram of a coefficient setting unit according to an embodiment of the present invention.

FIG. 4 schematically illustrates a functional block diagram of a coefficient setting unit according to an embodiment of the present invention. As illustrated in FIG. 4, according to an embodiment of the present invention, the coefficient setting unit comprises a receiving end data matrix acquisition unit 401, a training data vector acquisition unit 402 and a coefficient calculation unit 403.

The receiving end data matrix acquisition unit 401 is configured to construct a receiving end data matrix having the number of columns twice of the number of taps of the butterfly filter, based on data in a first polarization direction (direction H) and data in a second polarization direction (direction V) carried on a plurality of sub-carriers of respective phase-recovered symbols.

The training data vector acquisition unit 402 is configured to determine training data vectors in polarization directions H and V corresponding to the receiving end data matrix. In one embodiment, the training data vectors in polarization directions H and V are known transmitting end data (including transmitting end data in polarization directions H and V). The transmitting end data (including transmitting end data in polarization directions H and V) refers to data really transmitted on each sub-carrier by the transmitting end. In this embodiment, for example known pilot data is adopted. In another embodiment, transmitting to end data estimated at the receiving end may be used as the training data (e.g., data in a first polarization direction (direction H) and data in a second polarization direction (direction V) carried on a plurality of sub-carriers of respective phase-recovered and decided symbols, i.e., the received data). In the practical system, the received data may not be completely consistent with the really transmitted data, because there are various influence factors in the process of signal transmission and reception, such as noise, non-ideal channel estimation and equalization, inaccurate phase recovery, etc., which may cause symbol error/bit error. In that case, the training data vector may be different from the real transmitted data vector, but it is a better estimation of the really transmitted data when the symbol error rate/bit error rate is low, and the details will be given later. Thus, herein the term "determine" at least includes two meanings, i.e., "determine unanimously and definitely" and "estimate", and shall not be construed too ideally.

The coefficient calculation unit 403 is configured to determine a filter coefficient according to the receiving end data matrix and the training data vectors.

Figure 5:
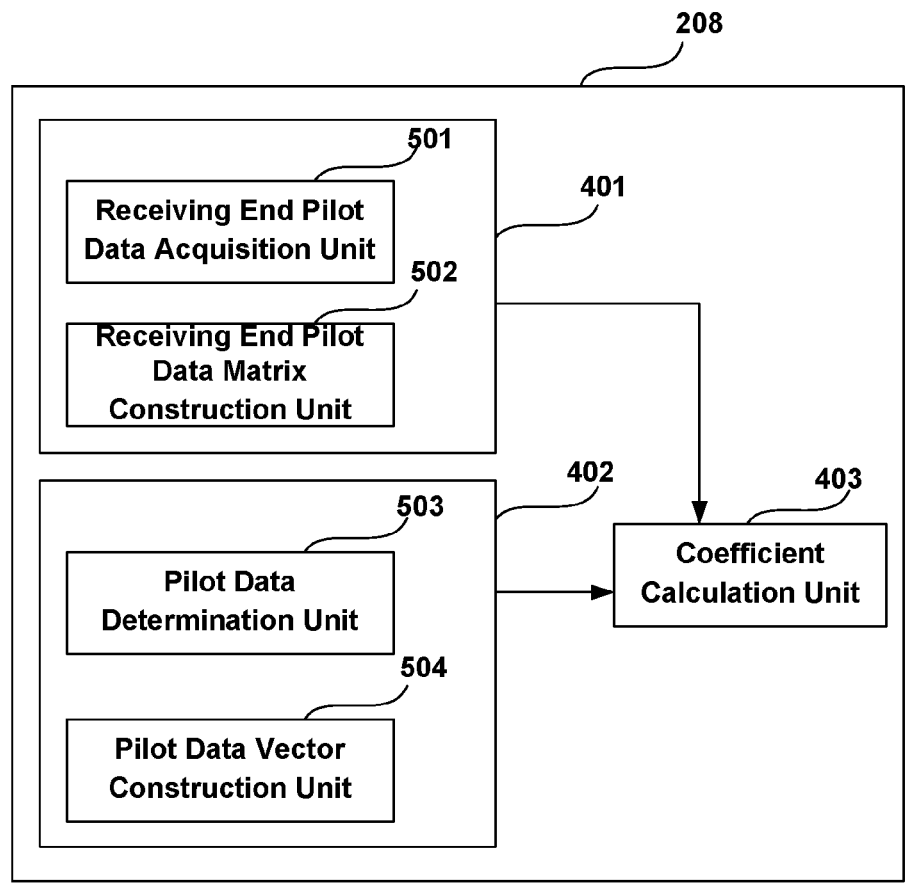
FIG. 5 schematically illustrates a functional block diagram of an example of the coefficient setting unit according to an embodiment of the present invention as illustrated in FIG. 4.

FIG. 5 schematically illustrates a functional block diagram of an example of the coefficient setting unit according to an embodiment of the present invention as illustrated in FIG. 4. In the embodiment illustrated in FIG. 5, the receiving end data matrix acquisition unit 401 comprises a receiving end pilot data acquisition unit 501 and a receiving end pilot data matrix construction unit 502; the training data vector acquisition unit 402 comprises a pilot data determination unit 503 and a transmitting end pilot data vector construction unit 504.

The receiving end pilot data acquisition unit 501 is configured to acquire the data on the plurality of sub-carriers, including a plurality of pilot sub-carriers, of the current symbol in phase-recovered H-polarized signal (first polarization signal) $X_h$ and phase-recovered V-polarized signal (second polarization signal) $X_v$. The receiving end pilot data matrix construction unit generates the receiving end data matrix one symbol by one symbol using the acquired data on the sub-carriers.

Specifically, in one embodiment, the number of the taps of the filter is set as an odd number L (L=2 m+1, m=0, 1, 2 . . . ), and the receiving end pilot data acquisition unit 501 acquires the data received on totally n pilot sub-carriers and several sub-carriers at two sides thereof. The receiving end pilot data matrix construction unit 502 constructs the receiving end pilot data matrix according to the extracted data on the sub-carriers in a predetermined rule.

In this embodiment, the receiving end pilot data matrix construction unit 502 takes the following data as the current row of the matrix: data carried on a certain pilot sub-carrier (assuming that the serial number is i) in polarization direction H, data carried in m sub-carriers previous to the pilot sub-carrier i, and data carried in m sub-carriers next to the pilot sub-carrier i, as well as data carried on the pilot sub-carrier i in polarization direction V, data carried in m sub-carriers previous to the pilot sub-carrier i, and data carried in m sub-carriers next to the pilot sub-carrier i. Thus, it can be seen that since the sub-carriers previous and next to the pilot sub-carrier (sub-carrier numbered as i+1) are not certainly pilot sub-carriers, the data used in the row are not all carried on the pilot sub-carriers. However, these sub-carriers for constructing the current row are sub-carriers centering at the current pilot sub-carrier. The row is referred to as being corresponding to the pilot sub-carrier i, or the pilot sub-carrier i is referred to as being corresponding to the row of the receiving end pilot data matrix.

A predetermined number (e.g., n) of pilot sub-carriers are totally acquired as current pilot sub-carriers, respectively, and then the data carried thereon is acquired. Next, data carried on m sub-carriers previous and next to the pilot sub-carrier i are acquired to obtain the receiving end data matrix. Obviously, in the matrix the number of columns is 2L, and the number of rows is n.

Figure 6:
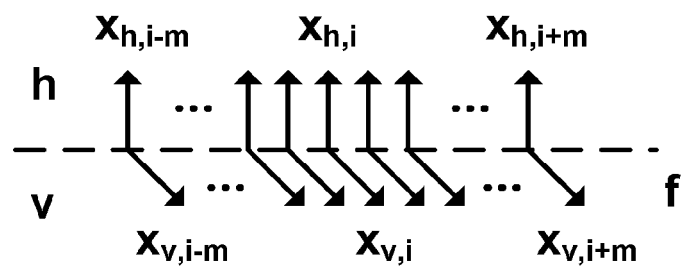
FIG. 6 schematically illustrates the $i^{th}$ row in an obtained receiving end data matrix.

FIG. 6 schematically illustrates the $i^{th}$ row in an obtained data matrix constructed by a receiving end data matrix construction unit. As illustrated in FIG. 6, it includes signals in totally L sub-carriers centering at the $i^{th}$ sub-carriers (herein are pilot sub-carriers) in OFDM symbols currently received in polarization directions H and V.

In a preferred embodiment, the predetermined number n of rows in the obtained receiving end data matrix is larger than 2L.

In some examples, there may be a case where the number of sub-carriers previous to the current pilot sub-carrier i is less than m. In that case, data in the columns which cannot obtain data from the sub-carriers among the 2L columns of the row may be filled as 0. For example, when there are only m−k (k is an integer less than m) sub-carriers previous to the current pilot sub-carrier, the data of the row may be as follows:

$0, 0, \ldots, 0, x_{h,i-m+k}, \ldots x_{h,i}, \ldots, x_{h,i+m}, 0, 0, \ldots, 0,$
$x_{v,i-m+k}, \ldots x_{v,i}, \ldots, x_{v,i+m}$ That is, k zeros are added to columns in polarization directions H and V, respectively.

Similarly, when the number of sub-carriers next to the current pilot sub-carrier i is less than m, data in the columns which cannot obtain data from the sub-carriers among the 2L columns of the row may be filled as 0. For example, when there are only k (k is an integer less than m) sub-carriers next to the current pilot sub-carrier, the data of the row may be as follows:

$x_{h,i-m}, \ldots, x_{h,i}, \ldots, x_{h,i+m-k}, 0, \ldots, 0, x_{v,i-m}, \ldots x_{v,i}, \ldots,$
$x_{v,i+m-k}, 0, \ldots 0,$ That is, k zeros are added to columns in polarization directions H and V, respectively.

Since the filled data is known, the filled case may be regarded as extracting data from the virtual sub-carriers all of 0, and sub-carriers mentioned in the present invention include the virtual sub-carriers unless otherwise specified in the context. Generally, both sides of the spectrum of the OFDM signal include several virtual sub-carriers all of 0.

In another embodiment, the number of the taps of the filter is set as an even number L (L=2m, m=0, 1, 2 . . . ). In that case, for polarization directions H and V, the data carried on the current pilot sub-carrier i, the data carried on m−1 sub-carriers previous to the current pilot sub-carrier and the data carried on m sub-carriers next to the current pilot sub-carrier may be obtained to construct the current row i of the receiving end data matrix. For polarization directions H and V, the data carried on the current pilot sub-carrier i, the data carried on m sub-carriers previous to the current pilot sub-carrier and the data carried on m−1 sub-carriers next to the current pilot sub-carrier may be obtained to construct the current row i of the receiving end data matrix. In the present invention, in that case, although the numbers of sub-carriers previous and next to the current pilot sub-carrier are not completely the same as each other, the sub-carriers still can be regarded as centering at the current pilot sub-carrier. Further, the difference between the numbers of sub-carriers previous and next to the current pilot sub-carrier may be not 1, but any number not more than a predetermined value (an integer larger than 1).

In addition, the pilot sub-carriers for each row may be discontinuous. That is, the pilot sub-carriers used as the current pilot sub-carriers may be jumpily selected to construct respective rows of the receiving end pilot data matrix. For example, if the sub-carriers numbered as i, i+10, i+20 and i+30 are pilot sub-carriers, the receiving end pilot data matrix construction unit 502 may take the sub-carriers numbered as i, i+10 and i+30 as the current pilot sub-carriers to construct the receiving end pilot data matrix. The order of rows in the matrix is not certainly ascending or descending order of serial numbers of the sub-carriers. For example, the sub-carriers numbered as i, i+30 and i+10 may be successively taken as the current pilot sub-carriers to construct the receiving end pilot data matrix.

In conclusion, the receiving end pilot data matrix construction unit 502 may construct the receiving end pilot data matrix in a predetermined rule. Since each row of the matrix is constructed for a certain pilot sub-carrier, the matrix is referred to as a pilot data matrix although not the data in each column of each row is the data carried on the pilot sub-carrier. The receiving end pilot data acquisition unit 501 may obtain corresponding data in adaption with the predetermined rule, for a usage by the receiving end pilot data matrix construction unit 502. The receiving end pilot data acquisition unit 501 does not merely acquire the data carried on the pilot sub-carriers, but it must acquire the data carried on a predetermined number (e.g., n) of pilot sub-carriers.

On the other hand, the pilot data acquisition unit 501 may also simply acquire the data carried on all the sub-carriers for a usage by the receiving end pilot data matrix construction unit 502. In that case, the receiving end pilot data matrix construction unit 502 screens the data by itself.

The transmitting end pilot data determination unit 503 acquires the pilot data on the pilot sub-carrier corresponding to each row in the receiving end pilot data matrix. Since the pilot data is known, the transmitting end pilot data determination unit 503 can obtain, for example through a table look-up, the data actually transmitted on those pilot sub-carriers by the transmitting end. The transmitting end pilot data vector construction unit 504 constructs transmitting end pilot data vectors in polarization directions H and V. To be noted, the obtained pilot data is also the data transmitted by the transmitting end on the sub-carrier corresponding to each row of the receiving end pilot data matrix (data in the first and second polarization directions).

The coefficient calculation unit obtains a coefficient of the butterfly filter one symbol by one symbol according to the pilot data and the phase-recovered frequency signal matrix. The description is given as follows.

Equation (3) may be briefly expressed in a form of matrix:

$$y_h = xw_h$$

$$y_v = xw_v \quad (4)$$

where $$w_h = \begin{bmatrix} w_{hh} \\ w_{vh} \end{bmatrix} \text{ and } w_v = \begin{bmatrix} w_{hv} \\ w_v \end{bmatrix}$$

are both filter coefficients and 2L-dimensional column vectors, L is the number of taps of the filter.

As can be seen from Equation (4), $W_h$ and $W_v$ can be determined if $y_h$, $y_v$ and x are known.

For the convenience of description, it is assumed that L=2 m+1 (m=0, 1, 2 ...). An input x of the filter is an $n_{sc} \times 2L$ matrix constructed by data in the phase-recovered frequency domain signal, $n_{sc}$ is the number of sub-carriers:

$$x = \begin{bmatrix} x_{h,1-m} & x_{h,1-m+1} & \cdots & x_{h,1+m} & x_{v,1-m} & x_{v,1-m+1} & \cdots & x_{v,1+m} \\ x_{h,2-m} & x_{h,2-m+1} & \cdots & x_{h,2+m} & x_{v,2-m} & x_{v,2-m+1} & \cdots & x_{v,2+m} \\ \vdots & & & \vdots & \vdots & & & \vdots \\ x_{h,n_{sc}-m} & x_{h,n_{sc}-m+1} & \cdots & x_{h,n_{sc}+m} & x_{v,n_{sc}-m} & x_{v,n_{sc}-m+1} & \cdots & x_{v,n_{sc}+m} \end{bmatrix} \quad (5)$$

The subscripts of the elements in x represent polarization directions and serial numbers of the sub-carriers, respectively (e.g., $x_{h,i-m}$ represents a signal on the (i−m)th sub-carrier of the OFDM symbol currently received in polarization direction H).

The outputs $y_h$ and $y_v$ of the filter are $n_{sc}$-dimensional column vectors.

In order to determine the filter coefficients $w_h$ and $w_v$ in Equation (4), the method of minimal mean square error (MMSE) may be adopted, i.e., $e_h$ and $e_v$ in the following equation shall be minimized:

$$e_h = \|x_{tr} w_h - t_h\|^2$$

$$e_v = \|x_{tr} w_v - t_v\|^2 \quad (6)$$

The obtained filter coefficients are:

$$w_h = (x_{tr}^H x_{tr})^{-1} x_{tr}^H t_h$$

$$w_v = (x_{tr}^H x_{tr})^{-1} x_{tr}^H t_v \quad (7)$$

In Equation (7), the superscript $^H$ represents a matrix conjugate transpose, and the superscript $^{-1}$ represents a matrix inversion. $x_{tr}$ is an input data matrix obtained according to the phase-recovered frequency domain signal. $t_h$ and $t_v$ represent transmitted data.

In this embodiment, the pilot data is known (i.e., $t_h$ and $t_v$ are known), and $X_{tr}$ is received and also known, thus the coefficients $W_h$ 和 $W_v$ can be determined.

Specifically, when a receiving end pilot data matrix is constructed for n (2L<n≤$n_p$) pilot sub-carriers, the following n×2L is obtained, which is a subset of x in Equation (5):

$$x_{tr} = \begin{bmatrix} x_{h,i_1-m} & x_{h,i_1-m+1} & \cdots & x_{h,i_1+m} & x_{v,i_1-m} & x_{v,i_1-m+1} & \cdots & x_{v,i_1+m} \\ x_{h,i_2-m} & x_{h,i_2-m+1} & \cdots & x_{h,i_2+m} & x_{v,i_2-m} & x_{v,i_2-m+1} & \cdots & x_{v,i_2+m} \\ \vdots & & & \vdots & \vdots & & & \vdots \\ x_{h,i_n-m} & x_{h,i_n-m+1} & \cdots & x_{h,i_n+m} & x_{v,i_n-m} & x_{v,i_n-m+1} & \cdots & x_{v,i_n+m} \end{bmatrix} \quad (8)$$

The subscripts of the elements in $x_{tr}$ represent polarization directions and serial numbers of the sub-carriers, respectively (e.g., $x_{h,i_1-m}$ represents a signal on the ($i_1$−m)th sub-carrier of the OFDM symbol currently received in polarization direction H). $i_1, i_2 \ldots i_n$ are serial numbers of the pilot sub-carriers, which can be arbitrarily selected from totally $n_p$ pilot sub-carriers. The pilot sub-carriers among the sub-carriers in the OFDM symbol are known to the receiver, thus the data carried on those pilot sub-carriers can be obtained.

In that case, $t_h$ and $t_v$ are n-dimensional column vectors, which represent pilot data transmitted by the transmitting end in polarization directions H and V, respectively. $t_h$ and $t_v$ are examples of transmitting end pilot data vectors in polarization directions H and V.

$$t_h = \begin{bmatrix} s_{h,i_1} \\ s_{h,i_2} \\ \vdots \\ s_{h,i_n} \end{bmatrix}, t_v = \begin{bmatrix} s_{v,i_1} \\ s_{v,i_2} \\ \vdots \\ s_{v,i_n} \end{bmatrix} \quad (9)$$

The subscripts of the elements in $t_h$ and $t_v$ represent polarization directions and serial numbers, respectively (e.g., $s_{h,i_1}$ represents pilot data on a pilot sub-carrier numbered as $i_1$ of the OFDM symbol currently transmitted in polarization direction H).

Equation (7) actually calculates the filter coefficient in the rule of MMSE according to received signal equation (8) and training data equation (9). To be emphasized, in the example n may be less than or equal to the total number $n_p$ of the pilot sub-carriers.

In the above embodiment, the filter coefficient is calculated by using the method of MMSE according to the frequency domain data matrix (the receiving end data matrix and the transmitting end pilot data vector), and it may also be calculated by using other method such as least mean square (LMS) algorithm.

Figure 7:
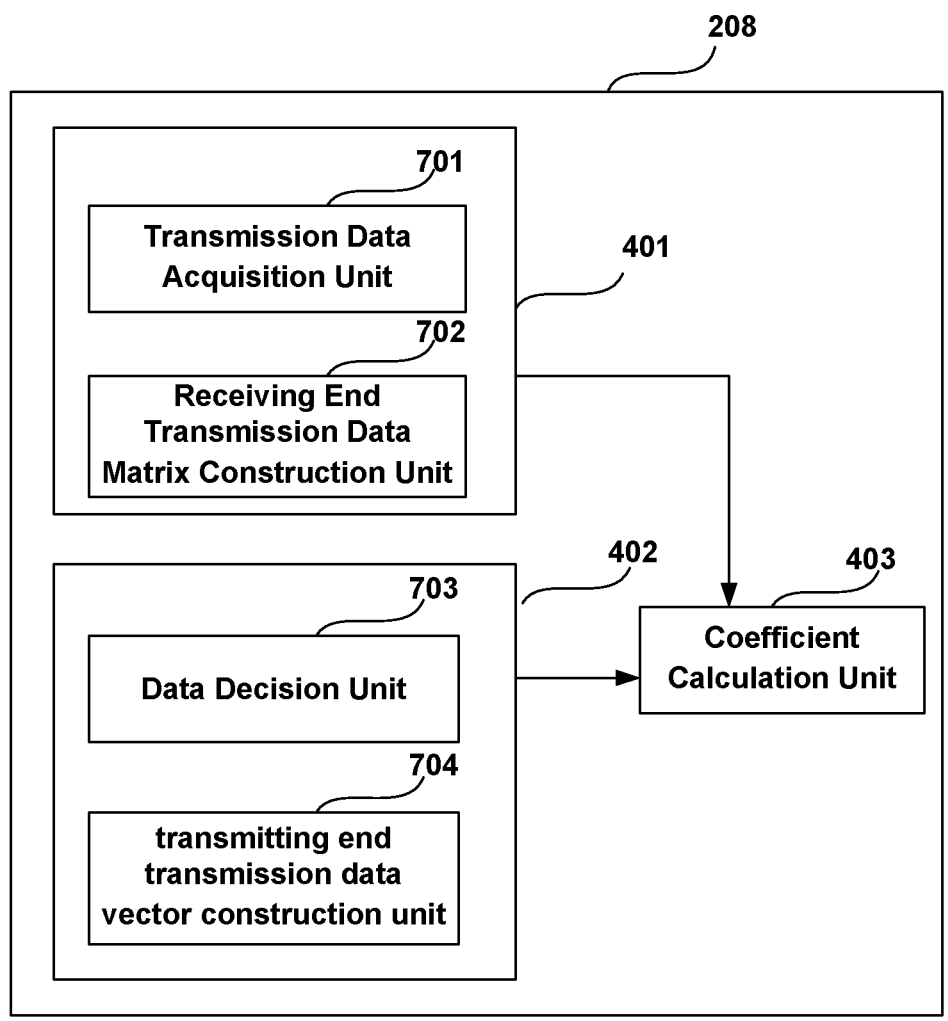
FIG. 7 schematically illustrates a functional block diagram of another example of the coefficient setting unit according to an embodiment of the present invention as illustrated in FIG. 4.

FIG. 7 schematically illustrates a functional block diagram of another example of the coefficient setting unit according to an embodiment of the present invention as illustrated in FIG. 4. In the example illustrated in FIG. 7, the receiving end data matrix acquisition unit 401 comprises a transmission data acquisition unit 701 and a receiving end transmission data matrix construction unit 702, and the transmitting end data matrix acquisition unit 402 comprises a data decision unit 703 and a transmitting end transmission data vector construction unit 704.

The transmission data acquisition unit 701 is configured to acquire the data on the plurality of sub-carriers of the current symbols in phase-recovered H-polarized signal (first polarization signal) $X_h$ and phase-recovered V-polarized signal (second polarization signal) $X_v$. Being different from the data acquisition unit 501 in the example illustrated in FIG. 5, the transmission data acquisition unit 701 in this example acquires the data on a predetermined number (e.g., n) of arbitrarily selected sub-carriers, which are not certainly pilot sub-carriers, and several sub-carriers at two sides thereof. In a particular case, the transmission data acquisition unit 701 acquires the data on n non-pilot sub-carriers and several sub-carriers at two sides thereof. To be emphasized, n in this example is the number of the arbitrarily selected sub-carriers.

The receiving end transmission data matrix construction unit 702 generates the receiving end transmission data matrix one symbol by one symbol by using the data carried on those sub-carriers. The receiving end transmission data matrix construction unit 702 constructs the receiving end transmission data matrix in the same or similar rule and manner as the receiving end pilot data matrix construction unit 502, and herein is omitted. That is, the matrix constructions in the two examples are the same, except the selection of the sub-carriers corresponding to each row.

The data decision unit 703 decides the phase-recovered signals $x_h$ and $x_v$, so as to recover the data transmitted by the transmitting end. In one embodiment, the data decision unit 703 only decides data carried on the sub-carriers corresponding to each row of the receiving end transmission data matrix, and recovers the data for a usage by the transmitting end transmission data vector construction unit 704. In another embodiment, the data decision unit 703 decides data carried on all the sub-carriers, and recovers the data for a usage by the transmitting end transmission data vector construction unit 704. In that case, the transmitting end transmission data vector construction unit 704 shall selects data by itself. The data decision may be made in any method known to a person skilled in the art at present or in future, such as soft decision and hard decision.

The transmitting end transmission data vector construction unit 704 constructs a transmitting end transmission data vector $t_h$ in polarization direction H and a training data vector $t_v$ in polarization direction V according to the decision results of $x_h$ and $x_v$.

$$t_h = \begin{bmatrix} \hat{s}_{h,i_1} \\ \hat{s}_{h,i_2} \\ \vdots \\ \hat{s}_{h,i_n} \end{bmatrix} \quad t_v = \begin{bmatrix} \hat{s}_{v,i_1} \\ \hat{s}_{v,i_2} \\ \vdots \\ \hat{s}_{v,i_n} \end{bmatrix} \quad (10)$$

The subscripts of the elements therein represent polarization directions and serial numbers of the sub-carriers, respectively (e.g., $\hat{s}_{h,i_1}$ is a decision result of $x_{h,i_1}$). In that case, the coefficient calculation is the same as the previous example.

To be noted again, herein the transmitting end transmission data vector is actually a vector composed of the decided data. The decided data is just the transmitting end data recognized by the receiving end, and it may be different from the data actually transmitted by the transmitting end. Thus, during the understanding of the present invention, the terms shall not be construed too narrowly or ideally, but construed in the perspective of practical applications by a person skilled in the art according to the context.

The transmitting end pilot data vectors in polarization direction H and the transmitting end transmission data vectors in polarization direction H are examples of the training data vectors in polarization direction H.

The transmitting end pilot data vectors in polarization direction V and the transmitting end transmission data vectors in polarization direction V are examples of the training data vectors in polarization direction V.

Figure 8:
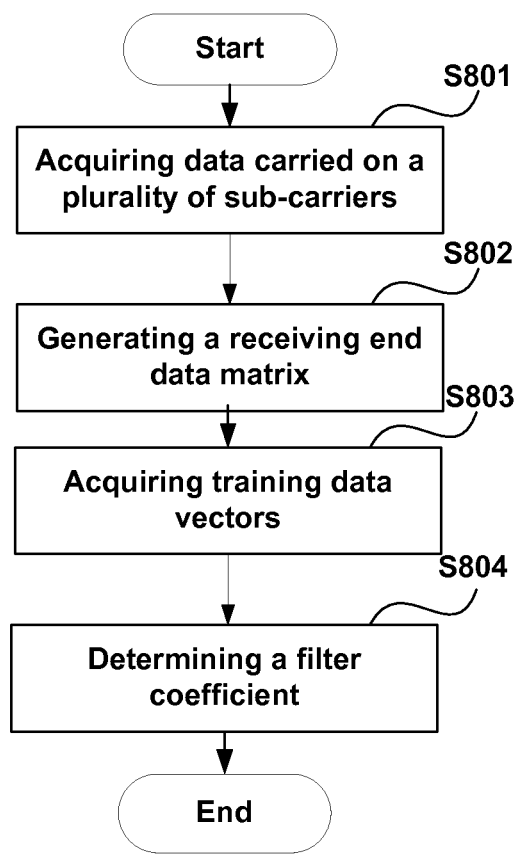
FIG. 8 schematically illustrates a work flowchart of a coefficient setting unit according to an embodiment of the present invention.

FIG. 8 schematically illustrates a work flowchart of a coefficient setting unit according to an embodiment of the present invention.

As illustrated in FIG. 8, firstly in step S801, acquiring data carried on a plurality of sub-carriers of the current symbols in phase-recovered H-polarized signal (first polarization signal) $X_h$ and phase-recovered V-polarized signal (second polarization signal) $X_v$. In one embodiment, the data carried on the plurality of sub-carriers including a plurality of pilot sub-carriers (i.e., received data) is acquired. Next, in step S802, generating a receiving end data matrix such as a receiving end pilot data matrix or a receiving end transmission data matrix in a predetermined rule (e.g., the above mentioned method for constructing each of the current rows) by using the acquired data carried on the plurality of sub-carriers, the receiving end pilot data matrix having 2L columns, wherein one L columns are data in polarization direction H and the other L columns are data in polarization direction Y. In step S803, acquiring training data vectors corresponding to the receiving end data matrix. In a case where the receiving end data matrix is a receiving end pilot data matrix, the training data vectors in polarization directions H and V may be constructed by using the pilot data corresponding to the pilot sub-carriers corresponding to respective rows of the receiving end pilot data matrix. In a case where the receiving end data matrix is a receiving end transmission data matrix, a data decision of the phase-recovered data is made to recover data (it may merely recover transmission data carried on the sub-carriers corresponding to respective rows of the receiving end pilot data matrix, or data carried on all the sub-carriers and make selection), and training data vectors in polarization directions H and V are constructed according those data. In step S804, determining a filter coefficient according to the constructed receiving end data matrix and the determined training data vectors.

To be noted, although the above steps are illustrated orderly, some steps (e.g., steps S801 and S802) thereof may be executed concurrently, or in a reverse order.

Figure 9:
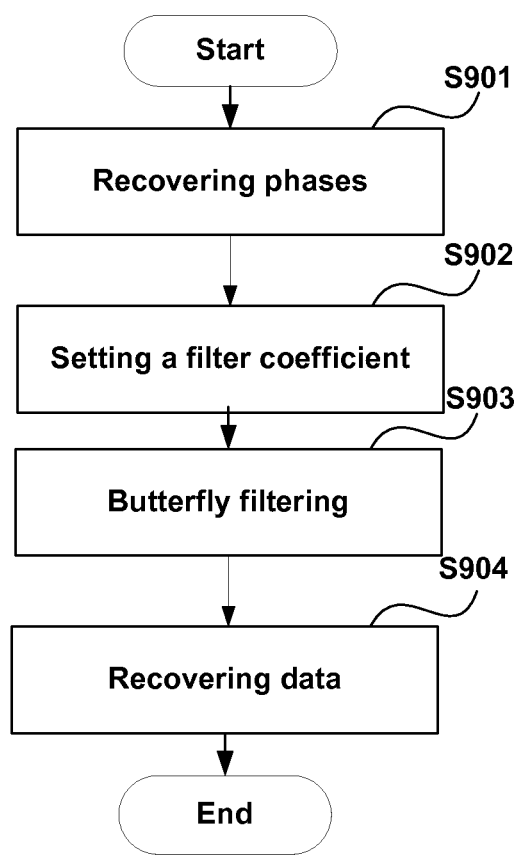
FIG. 9 illustrates a flowchart of a receiving method used in a DP-CO-OFDM receiver according to an embodiment of the present invention.

FIG. 9 illustrates a flowchart of a receiving method used in a DP-CO-OFDM receiver according to an embodiment of the present invention. As illustrated in FIG. 9, firstly in step S901, performing a phase recovery of a received signal one symbol by one symbol, so as to obtain a phase-recovered first polarization signal and a phase-recovered second polarization signal. Next in step S902, setting a filter coefficient used by a butterfly filter for the current OFDM symbol, one OFDM symbol by one OFDM symbol according to the phase-recovered first polarization signal and the phase-recovered second polarization signal. This step may be performed with the aforementioned method and device. Next in step S903, performing, by using the filter coefficient of the butterfly filter set in step S902, a butterfly filtration of the phase-recovered first polarization signal and the phase-recovered second polarization signal one symbol by one symbol, so as to obtain a butterfly-filtered first polarization signal and a butterfly-filtered second polarization signal. Finally in step S904, recovering data from the butterfly-filtered first polarization signal and the butterfly-filtered second polarization signal.

In the embodiments of the present invention, the descriptions of methods and steps may promote the understanding of devices and units, and the descriptions of devices and units may promote the understanding of methods and steps.

The above devices and methods of the present invention may be implemented by hardware, or a combination of hardware and software. The present invention also relates to a logic-part readable program which when being executed by a logic part, enables the logic part to implement the aforementioned device or constituent parts, or enables the logic part to implement the aforementioned methods or steps. The logic part for example may be a field programmable logic part, a microprocessor, a processor used in a computer, etc. The present invention further relates to a storage medium for storing the above program, such as hard disc, magnetic disc, optical disc, DVD, flash, magnetic optical disc, memory card, memory stick, etc.

Although the present invention is in detail described in conjunction with the embodiments, a person skilled in the art shall be clear that those descriptions are just exemplary, rather than limitations to the protection scope of the present invention. According to the spirit and principle of the present invention, a person skilled in the art can make various modifications and amendments thereto, which also fall within the protection scope of the present invention.

The invention claimed is:

1. A dual polarization coherent optical orthogonal frequency division multiplexing (DP-CO-OFDM) receiver, comprising:
a phase recovery device, configured to perform a phase recovery of a received signal one OFDM symbol by one OFDM symbol, so as to obtain a phase-recovered first polarization signal and a phase-recovered second polarization signal;
a coefficient setting unit, configured to set a filter coefficient for the current OFDM symbol;
a butterfly filter, configured to perform butterfly filtration of the phase-recovered first polarization signal and the phase-recovered second polarization signal one OFDM symbol by one OFDM symbol based on the filter coefficient, so as to obtain a butterfly-filtered first polarization signal and a butterfly-filtered second polarization signal; and
a data recovery device, configured to recover data from the butterfly-filtered first polarization signal and the butterfly-filtered second polarization signal
wherein the coefficient setting unit comprises:
a receiving end data matrix construction unit, configured to construct a receiving end data matrix having the number of columns twice of the number of taps of the butterfly filter, based on data in first and second polarization directions carried on a plurality of sub-carriers of respective OFDM symbols of the receiving end after the phase recovery;
a training data vector acquisition unit, configured to determine the data in the first and second polarization directions transmitted by a transmitting end on sub-carriers corresponding to respective rows of the receiving end data matrix, and construct training data vectors in the first and second polarization directions corresponding to the receiving end data matrix by using the determined data in the first and second polarization directions; and
a coefficient calculation unit, configured to determine a filter coefficient according to the receiving end data matrix and the training data vectors.

2. The receiver according to claim 1, wherein the butterfly filter comprises a first filter, a second filter, a first summator, a third filter, a fourth filter and a second summator,
wherein, the phase-recovered first polarization signal is input to the first filter and the third filter respectively, and the phase-recovered second polarization signal is input to the second filter and the fourth filter respectively,
the first summator is configured to obtain a sum of the first polarization signal filtered by the first filter and the second polarization signal filtered by the second filter, so as to obtain the butterfly-filtered first polarization signal, and
the second summator is configured to obtain a sum of the first polarization signal filtered by the third filter and the second polarization signal filtered by the fourth filter, so as to obtain the butterfly-filtered second polarization signal.

3. The receiver according to claim 2, wherein the first filter, the second filter, the third filter and the fourth filter are all finite impulse response (FIR) filters.

4. The receiver according to claim 1, wherein
the receiving end data matrix construction unit comprises:
a receiving end pilot data acquisition unit, configured to acquire the data in the first and second polarization directions carried on the plurality of sub-carriers, including a plurality of pilot sub-carriers;
a receiving end pilot data matrix construction unit, configured to construct a receiving end pilot data matrix as the receiving end data matrix according to a predetermined rule by using the data acquired by the receiving end pilot data acquisition unit, wherein each row in the receiving end pilot data matrix is corresponding one of the plurality of pilot sub-carriers, and
the training data vector acquisition unit comprises:
a transmitting end pilot data determination unit, configured to determine pilot data transmitted on the plurality of pilot sub-carriers by the transmitting end; and
a pilot data vector construction unit, configured to construct a pilot data vector in the first polarization direction as the training data vector in the first polarization direction, and a pilot data vector in the second polarization direction as the training data vector in the second polarization direction, by using the pilot data transmitted on the plurality of pilot sub-carriers.

5. The receiver according to claim 1, wherein
the receiving end data matrix construction unit comprises:
a transmission data acquisition unit, configured to acquire transmission data in the first and second polarization directions carried on the plurality of sub-carriers after the phase recovery;
a receiving end transmission data matrix construction unit, configured to construct a receiving end transmission data matrix as the receiving end data matrix according to a predetermined rule by using the transmission data, wherein each row of the receiving end transmission data matrix is corresponding to one of the plurality of sub-carriers, and
the training data vector acquisition unit comprises:
a data decision unit, configured to recover data in the first and second polarization directions carried on the sub-carriers corresponding to respective rows in the receiving end transmission data matrix; and
a transmitting end transmission data vector construction unit, configured to construct a transmitting end transmission data vector in the first polarization direction as a training data vector in the first polarization direction, and a transmitting end transmission data vector in the second polarization direction as a training data vector in the second polarization direction, by using the transmission data in the first and second polarization directions recovered by the data decision unit.

6. The receiver according to claim 1, wherein the coefficient calculation unit obtains a filter coefficient of the butterfly filter by using a minimal mean square error (MMSE) or a minimal mean square (MMS).

7. The receiver according to claim 1, wherein each row in the receiving end data matrix comprises data in the first and second polarization directions carried on L sub-carriers, where L is the number of taps of the butterfly filter.

8. The receiver according to claim 7, wherein the L sub-carriers are successive sub-carriers.

9. The receiver according to claim 1, wherein the number of rows of the receiving end data matrix is twice larger than the number of taps of the butterfly filter.

10. A receiving method used in a DP-CO-OFDM receiver, comprising:
performing a phase recovery of a received signal one OFDM symbol by one OFDM symbol, so as to obtain a phase-recovered first polarization signal and a phase-recovered second polarization signal;
setting a filter coefficient used by a butterfly filter for the current OFDM symbol;
performing, by the butterfly filter by using the filter coefficient, butterfly filtration of the phase-recovered first polarization signal and the phase-recovered second polarization signal one OFDM symbol by one OFDM symbol, so as to obtain a butterfly-filtered first polarization signal and a butterfly-filtered second polarization signal; and
recovering data from the butterfly-filtered first polarization signal and the butterfly-filtered second polarization signal,
wherein the step of setting a filter coefficient comprising:
constructing a receiving end data matrix having the number of columns twice of the number of taps of the butterfly filter, based on data in first and second polarization directions carried on a plurality of sub-carriers of respective OFDM symbols of the receiving end after the phase recovery;
determining the data in the first and second polarization directions transmitted by a transmitting end on sub-carriers corresponding to respective rows of the receiving end data matrix, and construct training data vectors in the first and second polarization directions corresponding to the receiving end data matrix by using the determined data in the first and second polarization directions; and
determining a filter coefficient according to the receiving end data matrix and the training data vectors.

11. A butterfly filter coefficient setting device capable of being used as a coefficient setting unit in the receiver according to claim 1, wherein the butterfly filter coefficient setting device comprises:
a receiving end data matrix construction unit, configured to construct a receiving end data matrix having the number of columns twice of the number of taps of the butterfly filter, based on data in first and second polarization directions carried on a plurality of sub-carriers of respective OFDM symbols of the receiving end after the phase recovery;
a training data vector acquisition unit, configured to determine the data in the first and second polarization directions transmitted by a transmitting end on sub-carriers corresponding to respective rows of the receiving end data matrix, and construct training data vectors in the first and second polarization directions corresponding to the receiving end data matrix by using the determined data in the first and second polarization directions; and
a coefficient calculation unit, configured to determine a filter coefficient according to the receiving end data matrix and the training data vectors.

12. The butterfly filter coefficient setting device according to claim 11, wherein
the receiving end data matrix construction unit comprises:
a receiving end pilot data acquisition unit, configured to acquire the data in the first and second polarization directions carried on the plurality of sub-carriers, including a plurality of pilot sub-carriers;
a receiving end pilot data matrix construction unit, configured to construct a receiving end pilot data matrix as the receiving end data matrix according to a predetermined rule by using the data acquired by the receiving end pilot data acquisition unit, wherein each row in the receiving end pilot data matrix is corresponding one of the plurality of pilot sub-carriers, and
the training data vector acquisition unit comprises:
a transmitting end pilot data determination unit, configured to determine pilot data transmitted on the plurality of pilot sub-carriers by the transmitting end; and
a pilot data vector construction unit, configured to construct a pilot data vector in the first polarization direction as the training data vector in the first polarization direction, and a pilot data vector in the second polarization direction as the training data vector in the second polarization direction, by using the pilot data transmitted on the plurality of pilot sub-carriers.

13. The butterfly filter coefficient setting device according to claim 11, wherein
the receiving end data matrix construction unit comprises:
a transmission data acquisition unit, configured to acquire transmission data in the first and second polarization directions carried on the plurality of sub-carriers after the phase recovery;
a receiving end transmission data matrix construction unit, configured to construct a receiving end transmission data matrix as the receiving end data matrix according to a predetermined rule by using the transmission data, wherein each row of the receiving end transmission data matrix is corresponding to one of the plurality of sub-carriers, and
the training data vector acquisition unit comprises:
a data decision unit, configured to recover data in the first and second polarization directions carried on the sub-carriers corresponding to respective rows in the receiving end transmission data matrix; and
a transmitting end transmission data vector construction unit, configured to construct a transmitting end transmission data vector in the first polarization direction as a training data vector in the first polarization direction, and a transmitting end transmission data vector in the second polarization direction as a training data vector in the second polarization direction, by using the transmission data in the first and second polarization directions recovered by the data decision unit.

14. A butterfly filter coefficient setting method, comprising:
constructing a receiving end data matrix having the number of columns twice of the number of taps of the butterfly filter, based on data in first and second polarization directions carried on a plurality of sub-carriers of respective OFDM symbols after phase recovery;
determining corresponding data in the first and second polarization directions transmitted by a transmitting end on the plurality of sub-carriers, and constructing training data vectors in the first and second polarization directions corresponding to the receiving end data matrix; and determining a filter coefficient according to the receiving end data matrix and the training data vectors.

* * * * *